United States Patent [19]
Toya et al.

[11] Patent Number: 5,654,622
[45] Date of Patent: Aug. 5, 1997

[54] SECONDARY BATTERY CHARGING METHOD AND APPARATUS WHICH CONTROLS PROTECTING VOLTAGE LEVEL OF BATTERY PROTECTING CIRCUIT

[75] Inventors: Shoichi Toya; Takayuki Mino, both of Mihara-gun, Japan

[73] Assignee: Sanyo Electric Co., Ltd., Osaka, Japan

[21] Appl. No.: 595,961

[22] Filed: Feb. 6, 1996

[30] Foreign Application Priority Data

Feb. 16, 1995 [JP] Japan ................................. 7-028126
Apr. 11, 1995 [JP] Japan ................................. 7-085432

[51] Int. Cl.$^6$ ........................... H01M 10/44; H01M 10/46
[52] U.S. Cl. .................................................. 320/21; 320/39
[58] Field of Search ................................. 320/5, 20, 21, 320/22, 30, 39, 40, 48; 361/86, 91

[56] References Cited

U.S. PATENT DOCUMENTS

| | | | |
|---|---|---|---|
| 5,237,259 | 8/1993 | Sampei | 320/39 X |
| 5,291,117 | 3/1994 | Rydborn | 320/21 |
| 5,307,000 | 4/1994 | Podrazhansky et al. | 320/21 X |
| 5,329,218 | 7/1994 | Rydborn | 320/21 |
| 5,475,294 | 12/1995 | Isoda | 320/39 X |
| 5,550,453 | 8/1996 | Bohne et al. | 320/22 |

FOREIGN PATENT DOCUMENTS

| | | |
|---|---|---|
| 2-119539 | 5/1990 | Japan. |
| 2-192670 | 7/1990 | Japan. |
| 4-331425 | 11/1992 | Japan. |
| 6-105457 | 4/1994 | Japan. |
| 6-113474 | 4/1994 | Japan. |

*Primary Examiner*—Edward Tso
*Attorney, Agent, or Firm*—Wenderoth, Lind & Ponack

[57] ABSTRACT

A secondary battery is connected to a protecting circuit. The protecting circuit interrupts charging of the secondary battery when the battery voltage of the secondary battery reaches a first protecting voltage which is higher than a first voltage, the first voltage being the full charge voltage of the secondary battery. After constant current charging of the secondary battery, the secondary battery is charged until the battery voltage of the secondary battery becomes higher than the first protecting voltage for achieving rapid charging of the secondary battery. When the secondary battery is charged in this condition, the protecting voltage of the protecting circuit is changed over to a second protecting voltage which is higher than the first protecting voltage for this preventing the protecting circuit from operating.

26 Claims, 6 Drawing Sheets

SECONDARY BATTERY CHARGING METHOD AND APPARATUS WHICH CONTROLS PROTECTING VOLTAGE LEVEL OF BATTERY PROTECTING CIRCUIT

BACKGROUND OF THE INVENTION

The present invention relates to a method for charging a nonaqueous secondary battery such as a lithium ion secondary battery or the like.

Generally, when a nonaqueous secondary battery such as a lead storage battery or a lithium ion secondary battery is charged, the secondary battery is firstly charged with a constant current. And when the battery voltage of the secondary battery reaches the full charge voltage by the abovementioned constant current charging, the secondary battery is charged with a constant voltage which is set at the full charge voltage. Then, when the constant voltage charging time reaches a predetermined time, or when the charging current at the time of the abovementioned constant voltage charging becomes below a predetermined value, the charging of the secondary battery is ended.

The secondary battery is charged with a constant current and then with a constant voltage. However, according to such a charging method, several hours are required for charging a secondary battery to the full charge, and rapid charging cannot be achieved.

Therefore, a method for reducing charging time of a secondary battery is described in the Japanese Non-examined Patent Publication No. 2-119539 issued May 7, 1990. In this Japanese Non-examined Patent Publication, a method for charging a secondary battery is disclosed which comprises continuously charging the secondary battery with a constant current till the battery voltage of the secondary battery reaches a predetermined value above the fullcharge voltage, and then charging the secondary battery with a constant voltage set at the full charge voltage.

On the other hand, as described in the Japanese Non-examined Patent Publication No. 4-331425 issued Nov. 19, 1992, a lithium ion secondary battery is connected to a protecting circuit for protecting the secondary battery from being deteriorated due to overcharging. This protecting circuit detects the battery voltage of the secondary battery. And when the battery voltage is above a predetermined protecting voltage (which is set at a voltage, for example, somewhat higher than the full charge voltage of the secondary battery), the protecting circuit interrupts the charging of the secondary battery.

As abovementioned, according to a method for charging a secondary battery comprising firstly charging the secondary battery with a constant current till the battery voltage of the secondary battery reaches a predetermined voltage above the full charge voltage, and then charging the secondary battery with a constant voltage set at the full charge voltage, a secondary battery can be rapidly charged. However, according to a method for charging a secondary battery comprising continuously charging the secondary battery with a constant current till the battery voltage of the secondary battery reaches a predetermined voltage, the secondary battery is apt to be more or less deteriorated, and it is not desirable to continuously carry out such a charging method.

Further, according to the abovementioned method, when a secondary battery connected to a protecting circuit is charged, the protecting circuit operates to interrupt the charging before the battery voltage of the secondary battery reaches a predetermined voltage higher than the full charge voltage. As a result, rapid charging cannot be achieved.

Therefore, a first object of the present invention is to provide a method for rapidly charging a secondary battery connected to a protecting circuit without deteriorating the secondary battery and an apparatus for carrying out the method.

Further, a method for rapidly charging a secondary battery is described in the Japanese Non-examined Patent Publication No. 6-113474 issued Apr. 22, 1994. This method comprises charging a secondary battery with a constant current till the battery voltage reaches a second voltage (for example, 4.5 V) which is higher than a first voltage (for example, 4.1 V) set at the full charge voltage, and thereafter pulse charging the secondary battery with regulating to the second voltage, and then constant voltage charging the same with the first voltage so as to achieve rapid charging.

As abovementioned, a secondary battery such as a nonaqueous secondary battery is sometimes connected to a protecting circuit for protecting the secondary battery from being deteriorated due to overcharging. Such a case is described, for example, in the Japanese Non-examined Patent Publication No. 6-105457 issued Apr. 15, 1994. In this Japanese Non-examined Patent Publication No. 6-105457 issued Apr. 15, 1994, a protecting circuit is described, which stops charging of a secondary battery when the battery voltage becomes above a protecting voltage (for example, 4.2 V)which is higher than first voltage set at the full charge voltage of the secondary battery. As a result, even if a secondary battery is charged with a constant current till the battery voltage reaches a second voltage higher than a protecting voltage for the purpose of rapidly charging the secondary battery as abovementioned, the protecting circuit operates to stop the charging of the secondary battery before the battery voltage of the secondary battery reaches the second voltage. Consequently, rapid charging of the secondary battery cannot be achieved.

Therefore, a second object of the present invention is to provide a method for rapidly charging a secondary battery connected to a protecting circuit constructed to stop the charging of the secondary battery when the battery voltage of the secondary battery is higher than a first voltage which is the full charge voltage of the secondary battery for a predetermined time, with preventing the protecting circuit from stopping the charging of the secondary battery and an apparatus for carrying out the method.

SUMMARY OF THE INVENTION

A first method according to the present invention is a method for charging a secondary battery connected to a protecting circuit. The protecting circuit interrupts the charging of the secondary battery when the battery voltage of the secondary battery reaches a first protecting voltage higher than a first voltage which is the full charge voltage. According to this charging method of the present invention, a secondary battery is firstly constant current charged, and then charged till the battery voltage becomes higher than the first protecting voltage so that rapid charging can be achieved. When the secondary battery is charged to such a state, the protecting circuit is prevented from operating by switching over the protecting voltage of the protecting circuit to a second protecting voltage higher than the first protecting voltage.

According to the method for charging a secondary battery of the present invention, preferably, a secondary battery is constant current charged, and thereafter the secondary battery is constant voltage charged respectively with the first voltage and with the second voltage higher than the first protecting voltage repeatedly for achieving rapid charging and during that constant voltage charging of the secondary battery with the second voltage, the protecting voltage of the protecting circuit is changed over to the second protecting voltage higher than the second voltage.

Further, according to a second method for charging a secondary battery of the present invention, preferably, a secondary battery connected to a protecting circuit is constant current charged and constant voltage charged, in which the secondary battery connected to a protecting circuit is firstly constant current charged and thereafter constant voltage charged. The constant voltage charging is carried out with a second voltage higher than a first protecting voltage. In that constant voltage charging, a charging circuit sends a first switch over signal to the protecting circuit, so that the protecting voltage of the protecting circuit is switched over to a second protecting voltage higher than the second voltage while the secondary battery is constant voltage charged with the second voltage.

Further, an apparatus for charging a secondary battery according to the present invention charges a secondary battery connected to a protecting circuit using a charging circuit for carrying out constant current charging and constant voltage charging. The protecting circuit interrupts the charging of a secondary battery when the battery voltage of the secondary battery reaches a first protecting voltage higher than a first voltage which is full charge voltage of the secondary battery. The charging circuit comprises a constant current charging means, a charging means for charging a secondary battery to a voltage higher than a first protecting voltage, and a first signal sending means for sending a first switch over signal to a protecting circuit at the time of charging a secondary battery to the voltage higher than the first protecting voltage. The protecting circuit is provided with a first switch over means for switching over the protecting voltage from the first protecting voltage to a second protecting voltage, in correspondence with the first switch over signal.

Further, the apparatus for charging a secondary battery according to the present invention preferably comprises a first constant voltage charging means for carrying out constant voltage charging with a first voltage, a second constant voltage charging means for carrying out constant voltage charging with a second voltage higher than the first protecting voltage, a control means for controlling the charging operation in such a manner that, after constant current charging a secondary battery by the constant current charging means, constant voltage charging by the first constant voltage charging means and constant voltage charging by the second constant voltage charging means are repeated, and a first signal sending means for sending a first switch over signal to the protecting circuit at the time of carrying out the constant voltage charging by the second constant voltage is provided with a first switch over means for switching over the first protecting voltage to a second protecting voltage higher than the second voltage, in correspondence with the first switch over signal.

This apparatus according to the present invention charges a secondary battery connected to a protecting circuit which interrupts charging the secondary battery when the battery voltage of the secondary battery reaches a first protecting voltage higher than a first voltage which is the full charge voltage of the secondary battery. This apparatus firstly carries out constant current charging of a secondary battery, and thereafter repeats constant voltage charging of the secondary battery with the first voltage which is the full charge voltage of the secondary battery and constant voltage charging of the secondary battery with the second voltage higher than the first protecting voltage. At this step, during the constant voltage charging of the secondary battery with the second voltage, the protecting voltage of the protecting circuit is changed over from the first protecting voltage to the second protecting voltage higher than the second voltage.

Thus, the secondary battery is rapidly charged by repeating the constant voltage charging with the first voltage and the constant voltage charging with the second voltage without interruption of the charging caused by the operation of the protecting circuit.

In the abovementioned apparatus, the constant voltage charging with the second voltage is not undesirably interrupted by the operation of the protecting circuit. And a secondary battery is not overcharged but it can be rapidly and most adequately charged by this apparatus.

Further, in the abovementioned apparatus in which the protecting voltage of the protecting circuit is changed over by sending a change over signal from the charging circuit to the protecting circuit, the set voltage of the protecting circuit can be surely changed over.

Further, since the charging current of the charging circuit for sending a change over signal to the protecting circuit is a pulse current, the charging circuit does not require any particular circuit or control terminal for sending a change over signal and therefore the structure of the charging circuit is not complicated.

Further, the method according to the present invention is a method for charging a secondary battery stops charging when the battery voltage of the secondary battery is above a protecting voltage higher than a first voltage which is the full charge voltage of the secondary battery for more than a set time. The method for charging a secondary battery according to the present invention comprises a step of pulse charging the secondary battery for a time shorter than a set time, a step of pulse discharging the secondary battery so that the battery voltage of the secondary battery is above a protecting voltage for move than the set time, and a step of temporarily stopping charging or discharging the secondary battery and detecting the voltage of the secondary battery, and a step of controlling the charging of the secondary battery based on the detected voltage.

In the abovementioned method, a secondary battery is pulse charged for a time shorter than a set time during which the protecting circuit operates. Thereafter, the secondary battery is pulse discharged so that the battery voltage of the secondary battery is not above a protecting voltage for a time longer than the set time. Thus, if the battery voltage of the secondary battery once becomes higher than the protecting voltage by the pulse charging, the battery voltage becomes lower than the protecting voltage within the set time by the following pulse discharging, and therefore the protecting circuit does not operate.

After that, charging and discharging the secondary battery is temporarily stopped and the voltage of the secondary battery (that is, the open voltage of the secondary battery) is detected, and when the open voltage reaches a first voltage, the rapid charging of the secondary battery is stopped.

According to the abovementioned method for charging a secondary battery of the present invention, a secondary battery can be rapidly charged without operating the protecting circuit which is so constructed as to stop charging when the battery voltage of the secondary battery becomes above a protecting voltage.

The abovementioned and further objects and features of the present invention will more fully be apparent from the following detailed description with reference to the accompanying drawings.

DETAILED DESCRIPTION OF THE INVENTION

Figure 1:
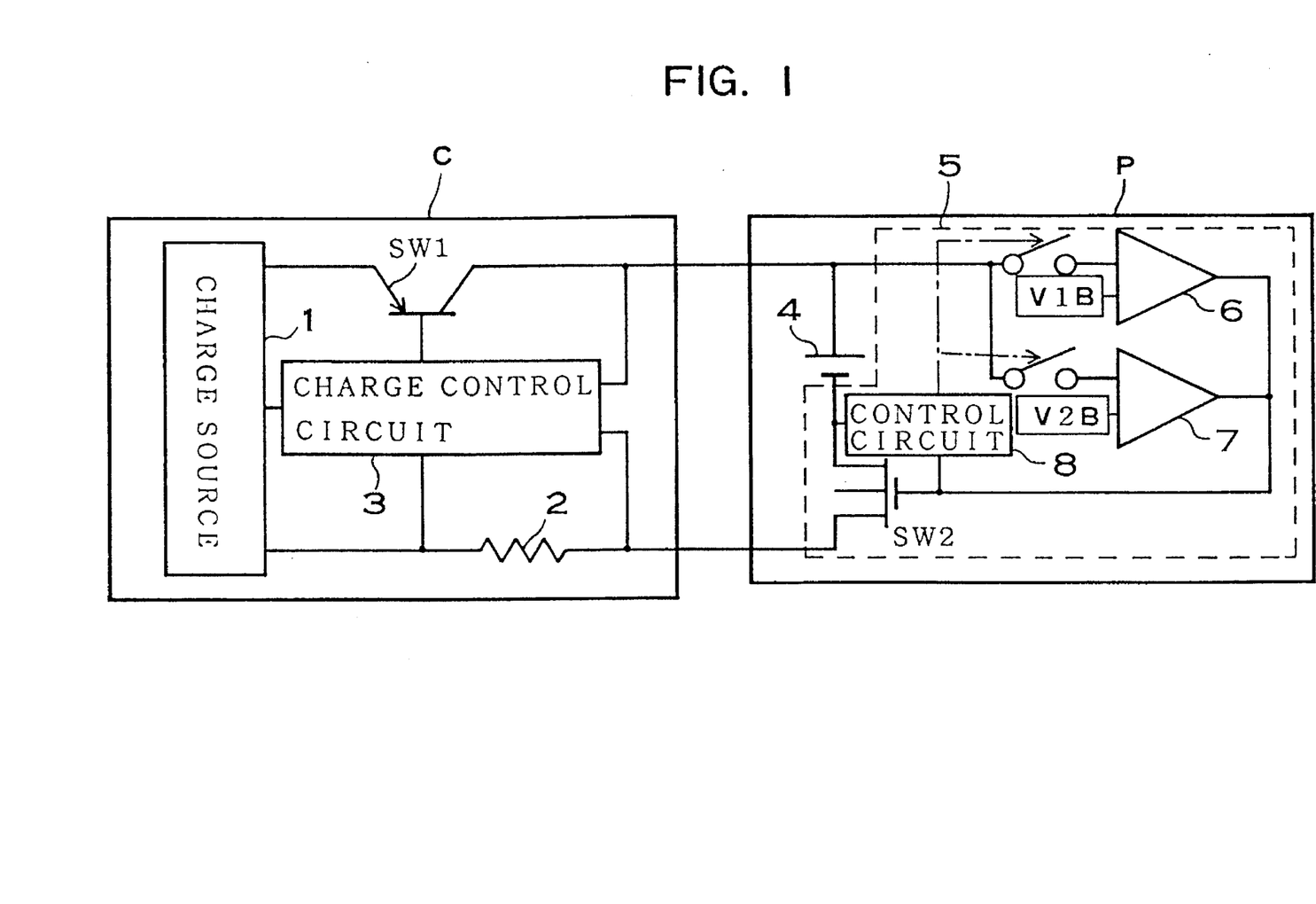
FIG. 1 is a block circuit diagram showing one embodiment of the present invention.

FIG. 1 is a block circuit diagram showing one embodiment of the present invention. C indicates a charging circuit. Numeral 1 indicates a charge source which includes therein a constant current charging circuit for constant current charging with a predetermined constant current I1, a first constant voltage charging circuit for constant voltage charging with a first voltage V1C, and a second constant voltage charging circuit for constant voltage charging with a second voltage V2C higher than the first voltage V1C. SW1 indicates a charge control switch for controlling charging current supply. Numeral 2 indicates a detecting resistance for detecting the charging current. Numeral 3 indicates a charge control circuit for controlling operation of the charge source 1 and the charge control switch SW1, and this charge control circuit 3 comprises a microcomputer.

P indicates a battery pack removably attachable to the charging circuit C. Numeral 4 indicates a lithium ion secondary battery which is hereinafter referred to only as secondary battery. Numeral 5 indicates a protecting circuit for protecting the secondary battery 4 from being overcharged. Further, SW2 indicates a protecting switch for protecting the secondary battery 4 from being overcharged, the protecting switch SW2 being connected to the secondary battery 4 in series, and comprising a FET. Numeral 6 indicates a first comparison circuit for comparing the battery voltage of the secondary battery 4 with a first protecting voltage V1B, and numeral 7 indicates a second comparison circuit for comparing the battery voltage of the secondary battery 4 with a second protecting voltage V2B higher than the first protecting voltage V1B. The first comparison circuit 6 or the second comparison circuit 7 turn off the protecting switch SW2 when the battery voltage of the secondary battery 4 becomes higher than the first protecting voltage V1B or the second protecting voltage V2B.

Further, Numeral 8 indicates a control circuit which detects the voltage of the inner resistance component of the protecting switch SW2, controls operation of the first comparison circuit 6 or the second comparison circuit 7 based on the detected voltage, and further controls operation of the protecting switch SW2 independently of the control of the first and the second comparison circuits 6,7.

The first voltage V1C of the charge source 1 is the full charge voltage of the secondary battery 4. And the relations between the first and the second voltages V1C, V2C and the first and the second protecting voltage V1B, V2B of the protecting circuit and examples of respective values of these voltage are as the following.

$$V1C(4.1\ V) < V1B(4.2\ V) < V2C(4.5\ V) < V2B(4.6\ V)$$

Now, a method for charging a secondary battery according to the present invention will be described in the following with reference to the flow chart of FIG. 2.

Figure 2:
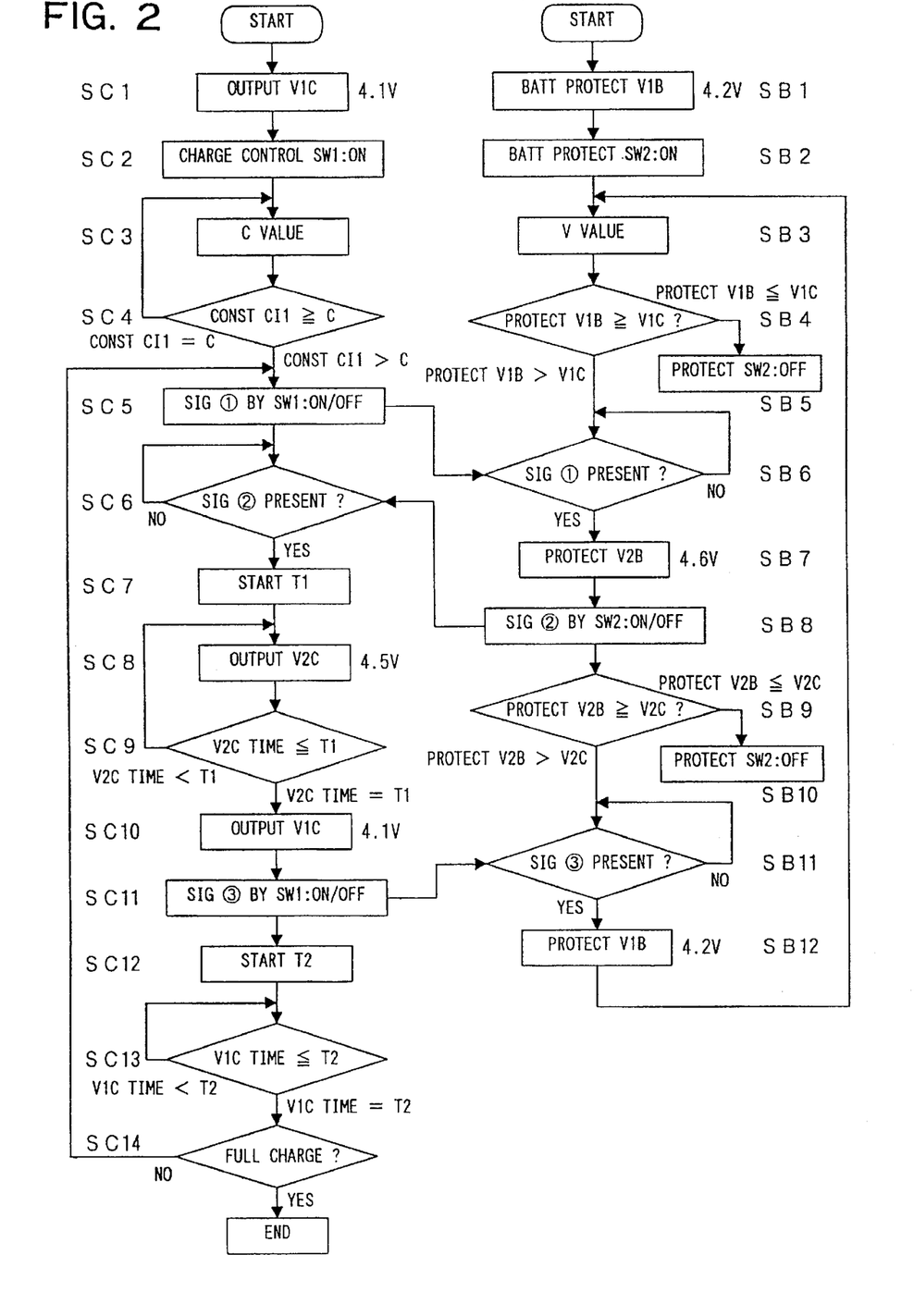
FIG. 2 is a flow chart showing one embodiment of the present invention.

In FIG. 2, the left flow shows control operation of the charge control circuit 3, and the right flow shows control operation of the protecting circuit 5.

At steps SC1 to SC3, the charge control circuit 3 constant current charges the secondary battery 4 with a charging current I1. At this time, the constant current charging circuit and the first constant voltage charging circuit of the charge source 1 are selected, and the secondary battery 4 is charged with the first voltage V1C as the charging voltage.

In this charging process, the protecting circuit 5 operates the first comparison circuit 6 by means of the control circuit 8, as shown at steps SB1 to SB5. Therefore, the first comparison circuit 6 judges whether the battery voltage of the secondary battery 4 is higher than the first protecting voltage V1B or not. If the battery voltage of the secondary battery 4 becomes higher than the first protecting voltage V1B on account of some trouble occurred in the first constant voltage charging circuit, the protecting circuit 5 turns OFF the protecting switch SW2 at step SB5 and thereby interrupts charging the secondary battery 4.

At step SC4, the charge control circuit 3 judges, based on the output of the detecting resistance 2, whether the charging current of the secondary battery 4 is lower than the constant current I1 or not (that is, whether the battery voltage of the secondary battery 4 reaches the first voltage V1C or not.) And when the charge control circuit 3 confirms that the charging current is lower than the constant current I1 (that is, the battery voltage reaches the first voltage V1C), the charge control circuit 3 repeats 10 ms of ON state and 10 ms of OFF state of the charge control switch SW1 for a predetermined time, and thereby makes the charging current supplied to the secondary battery 4 into the first pulse current (namely, the first signal ①) at step SC5.

At step SB6, the control circuit 8 judges whether the first signal ① is present or not, based on the detected both terminal voltages of the protecting switch SW2. When the control circuit 8 confirms that the first signal is present, the second comparison circuit 7 operates and the protecting voltage of the protecting circuit 5 becomes the second protecting voltage V2B at step SB7.

Further, at step SB8, the control circuit 8 repeats 7 mS of ON state and 13 mS of OFF state of the protecting switch SW2 for a predetermined time, and thereby makes the charging voltage supplied to the secondary battery 4 into the second pulse signal (namely, the second signal ②).

At step SC6, the charge control circuit 3 judges whether the second signal ② is present or not. When the charge control circuit 3 confirms that the second signal ② is present, the second constant current charging circuit of the charge source 1 is selected and the secondary battery 4 is constant voltage charged with the second voltage V2C for predetermined time at steps SC7 to SC9. At this time, as abovementioned, the protecting voltage of the protecting circuit 5 is the second protecting voltage V2B higher than the second voltage V2C, and therefore, the constant voltage charging of the secondary battery 4 with the second voltage V2C is not interrupted.

At this time, the second comparison circuit 6 operates in the protecting circuit 5 and judges whether the battery voltage of the secondary battery 4 is higher than the second protecting voltage V2B or not as shown at steps SB9 and SB10. When the battery voltage of the secondary battery 4 becomes higher than the second protecting voltage V2B on account of some trouble occurred in the second constant voltage charging circuit, the protecting circuit 5 turns OFF the protecting switch SW2 at step 10 and thereby interrupts charging the secondary battery 4.

When the predetermined time T1 passes and the constant voltage charging of the secondary battery 4 with the second voltage V2C ends, the charge control circuit 3 changes over to constant voltage charging with the first voltage V1C at step SC10 and repeats 5 mS of ON state and 15 mS of OFF state of the charge control switch SW1 for predetermined time at step SC11. The charge control circuit 3 makes the charging current supplied to the secondary battery 4 into the third pulse current (the third signal ③).

At step SB11, the control circuit 8 judges whether the third signal ③ is present or not. When the control circuit 8 judges that the third signal ③ is present, the control circuit 8 makes the first comparison circuit 6 operate at step B12. The first comparison circuit 6 changes over the protecting voltage of the protecting circuit 5 for the secondary battery 4 to the first protecting voltage V1B, and then the process returns to step SB3.

The constant voltage charging with the first voltage V1C is carried out for a predetermined time T2 as shown at steps SC12 and SC13. After that, the charge control circuit 3 judges whether the secondary battery 4 has reached the full charge or not at step SC14. This detection of the full charge is performed, for example, by judging whether the current value of the charging current is lower than a predetermined value or not. When the charge control circuit 3 judges that the secondary battery 4 has not reached the full charge, the process returns to step SC5.

Therefore, the charge control circuit 3 repeats the predetermined time T1 of the constant voltage charging with the second voltage V2C and the predetermined time T2 of the constant voltage charging with the first voltage V1C till the secondary battery 4 reaches the full charge. At the same time, the protecting circuit 5 repeats the protection with the second protecting voltage V2B and the protection with the first protecting voltage V1B and thereby protects the constant voltage charging with the second voltage V2C and the constant voltage charging with the first voltage V1C from being interrupted and also protects the secondary battery 4 from being undesirably overcharged.

When the full charge of the secondary battery 4 is detected at step SC14, the charge control switch SW1 is turned OFF and the charging is ended.

In the abovementioned embodiment, a secondary battery is charged with the first voltage V1C used at step SC10 being set at 4.1 V. However, the first voltage V1C used at step SC10 may be set at a voltage that makes the charging voltage for the secondary battery be 0, in other words, may be a voltage that suspends the charging. According to this charging method, the time T1 of the constant voltage charging with the second voltage V2C and the time T2 of suspension of the charging are repeated and thereby the secondary battery is charged to the full charge.

Further, the method for charging a secondary battery of the present invention may comprise pulse charging the secondary battery so that the battery voltage of the secondary battery becomes higher than the abovementioned first protecting voltage. For example, a secondary battery may be pulse charged in such a manner that a predetermined capacity of the secondary battery is charged, and when the battery voltage of the secondary battery is higher than the first voltage, charging is suspended till the battery voltage becomes lower than the first voltage, and these steps are repeated. In this case, the protecting voltage of the protecting circuit is changed over to the second protecting voltage.

Further, according to the abovementioned charging method, by changing the protecting voltage which operates the protecting circuit included in the secondary battery, the secondary battery is rapidly charged. The protecting circuit for the secondary battery can be prevented from operating by shortening the time used for rising of the voltage of the secondary battery. Such an embodiment will be described in the following.

Figure 3:
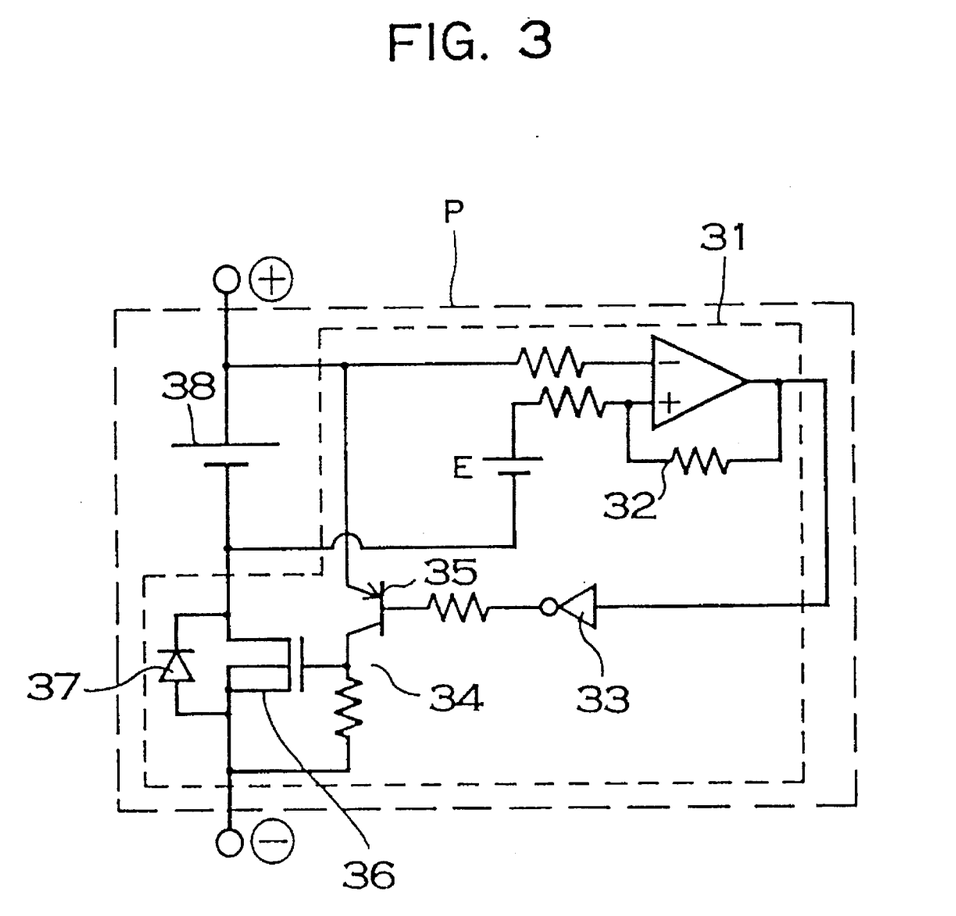
FIG. 3 is a circuit diagram showing an embodiment of a battery pack charged according to the present invention.

FIG. 3 shows a battery pack P to be charged according to the charging method of the present invention. The battery pack P is provided with a protecting circuit 31. The protecting circuit 31 stops charging a secondary battery 38 which is a lithium ion secondary battery when the battery voltage of the secondary battery 38 is above a protecting voltage E (for example, 4.2 V) higher than the first voltage V1 (for example, 4.1 V) which is the full charge voltage of the secondary battery 38 more than a predetermined time. The protecting circuit 31 comprises a Schmidt trigger circuit 32 which compares the battery voltage of the secondary battery 38 with the protecting voltage E and reverses the output to HIGH or LOW based on the result of the comparison, a reversing amplification circuit 33 for reversing the output of the Schmidt trigger circuit 32, and a switching circuit 34 which is controlled to ON or OFF by the output of the reversing amplification circuit 33. The switching circuit 34 comprises a transistor 35, and a MOSFET 36 provided with a parasitic diode 37. When the battery voltage of the secondary battery 38 is above the protecting voltage for more than 100 msec, the protecting circuit 31 turns OFF the MOSFET 36 and stops charging the secondary battery 38.

Figure 4:
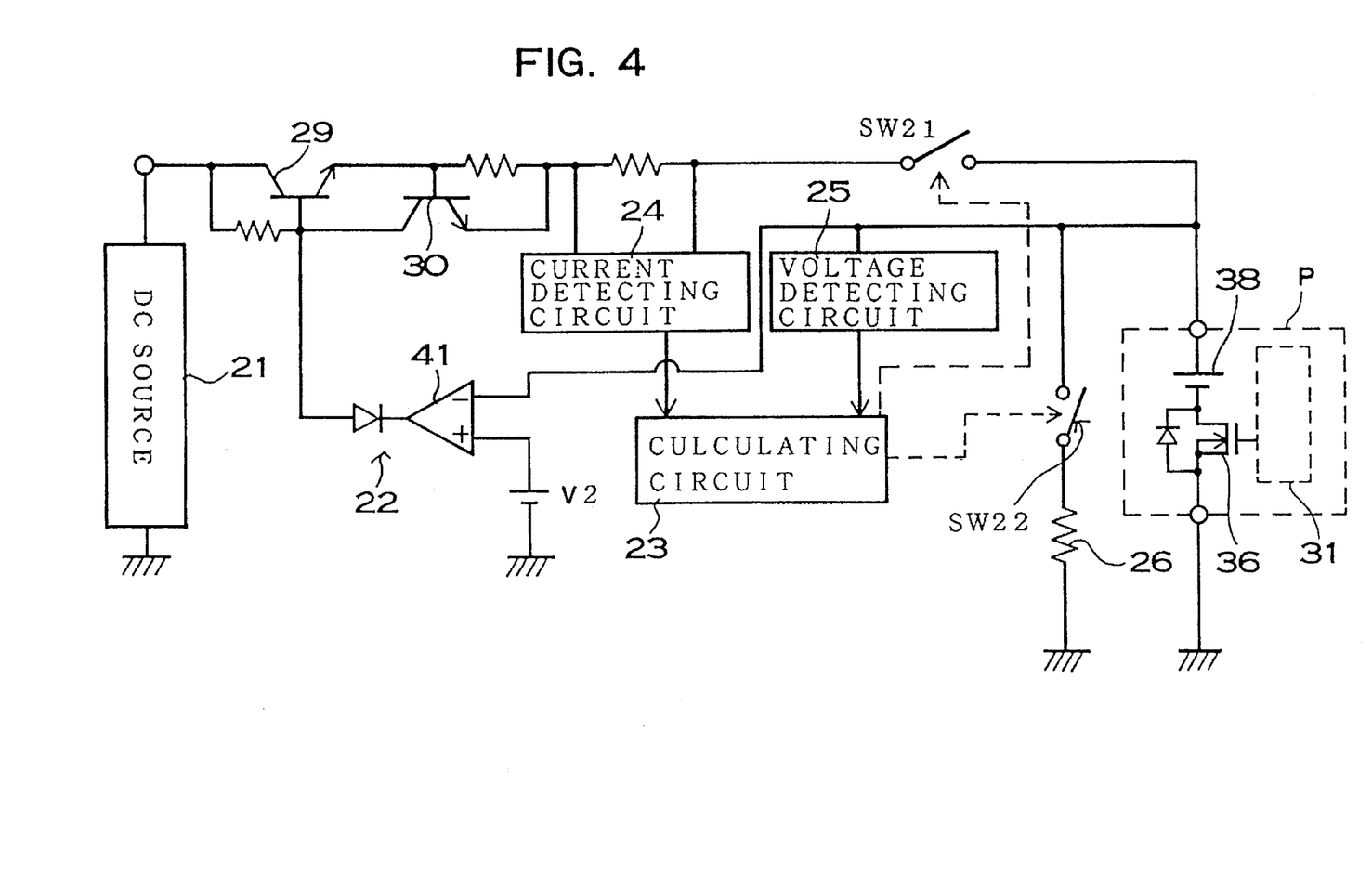
FIG. 4 is a circuit diagram showing another embodiment of the present invention.

FIG. 4 shows a charging circuit for charging the abovementioned battery pack P. The source circuit 21 comprises an input filter for removing noises included in the commercial AC 100 V source, a rectifying circuit for converting an inputted an AC to DC, a switching section for converting the DC of the rectifying circuit to a high frequency AC, a converting transformer for converting the high frequency AC to a predetermined voltage, and a conventional DC source circuit such as a rectifying smoothing circuit for rectifying an AC output of the converting transformer and converting the same to a smooth AC.

The charging circuit comprises a constant current and constant voltage charging circuit 22 for controlling the charging voltage and the charging current supplied to the secondary battery 38 by controlling the output of the source circuit, a calculating circuit 23, a current detecting circuit 24 for detecting the charging current, a voltage detecting circuit 25 for detecting the battery voltage, and a discharging circuit of a charge control switch SW21 connected between the source circuit 21 and the secondary battery 38, and a discharge resistance 26 and a discharge control switch SW22 connected in paralleled with the secondary battery 38.

The constant voltage and constant current charging circuit 22 is provided with two transistors 29, 30 constituting a constant current circuit, a differential amplifier 41 connected to the base of the transistor 29, and a second voltage V2 (for example, 4.5 V) connected to the + input terminal of the differential amplifier 41. The differential amplifier 41 controls the base voltage of the current control transistor 29 and thereby controls the charging voltage so that the charging voltage does not become higher than the second voltage V2.

The calculating circuit 23 comprises a microcomputer. The calculating circuit 23 detects the charging state of the secondary battery 38 by calculating the outputs of the current detecting circuit 24 and the voltage detecting circuit 25 which are A/D converters, controls ON and OFF states of the charge control switch SW21 and the discharge control switch SW22 and carries out pulse charging and pulse discharging of the secondary battery 38. For controlling the time of the pulse charging and the pulse discharging, the calculating circuit 23 has a timer circuit (not shown) therein.

Figure 5:
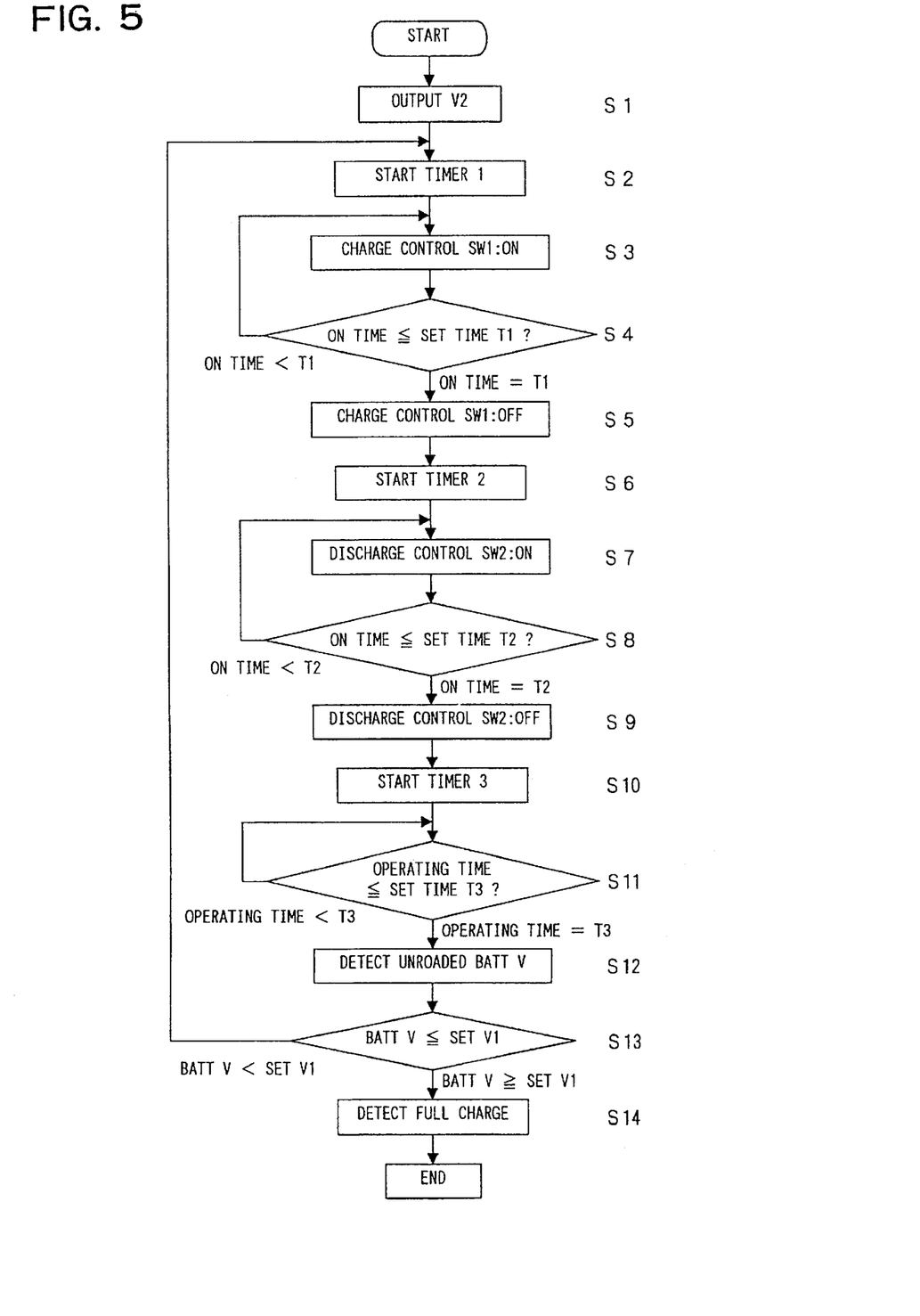
FIG. 5 is a flow chart showing another embodiment of the present invention.
Figure 6:
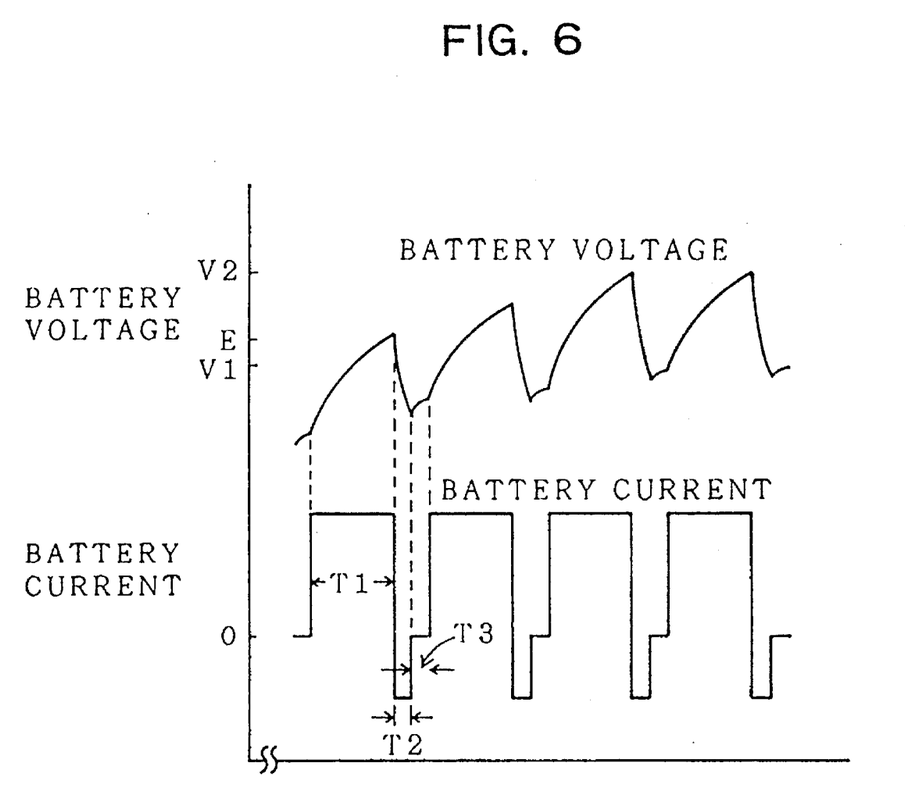
FIG. 6 is a graph partly showing the battery voltage of a secondary battery charged by another embodiment of the present invention and the charging current.

An embodiment of the method for charging a secondary battery of the present invention will now be described in the following with reference to the flow chart of FIG. 5 and the graph of FIG. 6.

At steps S1 to S4, the charge control switch 21 is turned ON, and the charging voltage of the secondary battery 38 is controlled to be the second voltage V2 (4.5 V), that is, the battery voltage of the secondary battery 38 is controlled not to be higher than the second voltage V2, and the secondary battery 38 is pulse charged with 1C to 3C constant current for the predetermined time T1 (80 sec).

At step 5, after the predetermined time T1 passes, the charge control switch SW 2 is turned OFF and the pulse charging of the secondary battery is stopped.

At steps S6 to S8, the discharge control switch SW22 is turned ON and the secondary battery 38 is pulse discharged for the predetermined time T2 (10 msec). Therefore, if the battery voltage of the secondary battery 38 becomes higher than the protecting voltage of the protecting circuit 38 by the abovementioned pulse charging, the battery voltage of the secondary battery 38 rapidly becomes lower than the protecting voltage by this pulse discharging. Therefore, the battery voltage of the secondary battery 38 is not above the protecting voltage for more than 100 msec which the operating time of the protecting circuit 31.

At steps S9 to S12, the discharge control switch SW22 is turned OFF and the pulse discharging of the secondary battery is interrupted, and after the predetermined time T3 (10 msec) passes, the battery voltage of the secondary battery 38 is detected. The battery voltage indicates the open circuit voltage, and therefore, the battery voltage of the secondary battery 38 independently of the internal resistance of the secondary battery 38, contact resistances of the attached parts of the battery pack P and the like can be detected.

At step 13, it is judged whether the detected battery voltage of the secondary battery 38 is reaches the predetermined voltage V1 (namely, the full charge 4.1 V) or not. When the battery voltage does not reach the predetermined voltage V1, the process returns to step S2, and thereafter the pulse charging, the pulse discharging and the battery voltage detecting are repeated.

And when the battery voltage reaches the predetermined voltage V1, the full charge is detected at step S14, and the charging process of the secondary battery 38 is ended. However, instead of ending the charging process of the secondary battery 38 directly after detecting the full charge, the charging process may be ended after constant voltage charging with the predetermined voltage V1 is carried out and a predetermined time passes or the charging current becomes lower than a predetermined value.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A method for charging a secondary battery provided with a protecting circuit which interrupts charging of the secondary battery when the battery voltage of the secondary battery reaches a first protecting voltage which is higher than a first voltage, the first voltage being a full charge voltage of the secondary battery, comprising:

a step of constant current charging the secondary battery; and a step of further charging the secondary battery until the battery voltage of the secondary battery becomes higher than the first protecting voltage, and then charging the secondary battery after changing the protecting voltage of the protecting circuit to a secondary protecting voltage which is higher than the first protecting voltage when the battery voltage of the secondary battery becomes higher than the first protecting voltage.

2. A method for charging a secondary battery as claimed in claim 1, in which after the step of constant current charging of the secondary battery, said method includes repeating constant voltage charging of the secondary battery with the first voltage and constant voltage charging of the secondary battery with a second voltage which is higher than the first protecting voltage.

3. A method for charging a secondary battery as claimed in claim 2, in which the step of the constant voltage charging of the secondary battery with the first voltage includes a step of suspending the charging of the secondary battery.

4. A method for charging a secondary battery as claimed in claim 2, in which the secondary battery is a lithium ion secondary battery.

5. A method for charging a secondary battery as claimed in claim 4, in which the first voltage is 4.1 V.

6. A method for charging a secondary battery as claimed in claim 5, in which the first protecting voltage is 4.2 V.

7. A method for charging a secondary battery as claimed in claim 4, in which the second voltage is 4.5 V.

8. A method for charging a secondary battery as claimed in claim 7, in which the second protecting voltage is 4.6 V.

9. A method for charging a secondary battery provided with a protecting circuit which interrupts charging of the secondary battery when the battery voltage of the secondary battery reaches a first protecting voltage which is higher than a first voltage, the first voltage being a full charge voltage of the secondary battery, by means of a charging circuit, comprising:

a step of constant current charging the secondary battery; and a step of further charging the secondary battery until the battery voltage of the secondary battery becomes higher than the first protecting voltage, and then sending a first change over signal from the charging circuit to the protecting circuit to cause the protecting voltage of the protecting circuit to change over to a second protecting voltage which is higher than the first protecting voltage.

10. A method for charging a secondary battery as claimed in claim 9, in which after the step of constant current charging of the secondary battery, said method includes repeating constant voltage charging of the secondary battery with the first voltage and constant voltage charging of the secondary battery with a second voltage which is higher than the first protecting voltage.

11. A method for charging a secondary battery as claimed in claim 10, in which by sending a second change over signal from the charging circuit to the protecting circuit before changing over from the constant voltage charging with the second voltage to the constant voltage charging with the first voltage, the protecting voltage of the protecting circuit is changed over from the secondary protecting voltage to the first protecting voltage.

12. A method for charging a secondary battery as claimed in claim 11, in which the charging circuit sends pulse current signals formed of the charging current as the first and the second change over signals to the protecting circuit.

13. A method for charging a secondary battery as claimed in claim 10, in which the step of the constant voltage charging of the secondary battery with the first voltage includes a step of suspending the charging of the secondary battery.

14. A method for charging a secondary battery as claimed in claim 10, in which the second battery is a lithium ion secondary battery.

15. A method for charging a secondary battery as claimed in claim 14, in which the first voltage is 4.1 V.

16. A method for charging a secondary battery as claimed in claim 15, in which the first protecting voltage is 4.2 V.

17. A method for charging a secondary battery as claimed in claim 14, in which the second voltage is 4.5 V.

18. A method for charging a secondary battery as claimed in claim 17, in which the second protecting voltage is 4.6 V.

19. An apparatus for charging a secondary battery provided with a protecting circuit which interrupts charging of the secondary battery when the battery voltage of the secondary battery reaches a first protecting voltage which is higher than a first voltage, the first voltage being a full charge voltage of the secondary battery, comprising:
  (a) a charging circuit for charging the secondary battery and including
    (1) a constant current charging means for constant current charging of the secondary battery,
    (2) a charging means for charging the secondary battery to a voltage which is higher than the first protecting voltage, and
    (3) a first signal sending means for sending a first change over signal to the protecting circuit at the time of charging the secondary battery to a voltage which is higher than the first protecting voltage, and
  (b) the protecting circuit including
    (1) a first change over means for changing over from the protecting voltage to a second protecting voltage which is higher than the first protecting voltage in correspondence with the first change over signal.

20. An apparatus for charging a secondary battery provided with a protecting circuit which interrupts charging of the secondary battery when the battery voltage of the secondary battery reaches a first protecting voltage which is higher than a first voltage, the first voltage being a full charge voltage of the secondary battery, comprising:
  (a) a charging circuit for charging the secondary battery and including
    (1) a constant current charging means for constant current charging the secondary battery,
    (2) a first constant voltage charging means for constant voltage charging the secondary battery with the first voltage,
    (3) a second constant voltage charging means for constant voltage charging the second battery with the second voltage which is higher than the first protecting voltage,
    (4) a control means for controlling a charging operation after the constant current charging of the secondary battery by the constant current charging means, so as to repeat constant voltage charging by the first constant voltage charging means and constant voltage charging by the second constant voltage charging means, and
    (5) a first signal sending means for sending a first change over signal to the protecting circuit before the constant voltage charging of the secondary battery by the second voltage charging means; and
  (b) a protecting circuit which interrupts charging of the secondary battery when the battery voltage of the secondary battery reaches the first protecting voltage which is the full charge voltage of the secondary battery, including
    a first change over means for changing over from the first protecting voltage to a second protecting voltage which is higher than the second voltage in correspondence with the first change over signal.

21. An apparatus for charging a secondary battery as claimed in claim 20, in which the charging circuit further includes a second signal sending means for sending a second signal to the protecting circuit before the changing over from the constant voltage charging by the second constant voltage charging means to the constant voltage charging by the first constant voltage charging means, and the protecting circuit further includes a second change over means for changing over from the second protecting voltage of the first protecting voltage in correspondence with the second change over signal.

22. A method for charging a secondary battery provided with a protecting circuit which interrupts charging of the secondary battery when the battery voltage of the secondary battery is above a protecting voltage which is higher than a first voltage, the first voltage being a full charge voltage of the secondary battery, for more than a predetermined time, comprising:
  a step of pulse charging the secondary battery for a time which is shorter than the predetermined time set in the protecting circuit;
  a step of pulse discharging the secondary battery in such a manner that the battery voltage of the secondary battery does not becomes higher than the protecting voltage for more than the predetermined time;
  a step of temporarily suspending the pulse charging and the pulse discharging and detecting the battery voltage of the secondary battery; and
  a step of controlling the charging of the secondary battery in correspondence with the detected battery voltage.

23. A method for charging a secondary battery as claimed in claim 22, in which the pulse charging is executed by a constant current charging in such a manner that the battery voltage of the secondary battery does not become higher than a second voltage which is higher than the protecting voltage.

24. A method for charging a secondary battery as claimed in claim 22, in which the secondary battery is a lithium ion secondary battery.

25. A method for charging a secondary battery as claimed in claim 24, in which the first voltage is 4.1 V.

26. A method for charging a secondary battery as claimed in claim 25, in which the protecting voltage is 4.2 V.

* * * * *